UNITED STATES PATENT OFFICE.

WILHELM MAJERT, OF GRUENAU, AND ALBRECHT SCHMIDT, OF BERLIN, ASSIGNORS TO THE CHEMISCHE FABRIK AUF ACTIEN, VORMALS E. SCHERING, OF BERLIN, GERMANY.

PIPERAZIN HYDRATE.

SPECIFICATION forming part of Letters Patent No. 505,113, dated September 19, 1893.

Application filed August 15, 1893. Serial No. 483,175. (No specimens.)

*To all whom it may concern:*

Be it known that we, WILHELM MAJERT, of Gruenau, and ALBRECHT SCHMIDT, of Berlin, Prussia, Germany, subjects of the King of Prussia, have invented new and useful Improvements in Piperazin Hydrate, of which the following is a specification.

This invention relates to a new composition of matter and has for its object to produce a solid substance which is useful for therapeutic purposes, principally as a solvent of uric acid, and also, to a considerable extent, as a solvent of albuminous formations.

In Letters Patent of the United States, No. 471,520, granted March 22, 1892, to William Majert, assignor, &c., for process of making piperazin, there is described a certain process of manufacture which results in certain piperazin salts which, it was supposed, were similar in many respects to spermin and capable of use as stimulants. We have produced piperazin hydrate which substance differs in many important particulars from the piperazin salts mentioned in that patent and which possesses great utility as a therapeutic agent.

The piperazin hydrate may be produced as follows:—To any of the piperazin hydro-carbon compounds mentioned in Letters Patent No. 471,520 is added from two to four parts, by weight, of a soda or potash lye containing about twenty five per cent. of the alkali. The mixture is then distilled. The resulting distillate consists of water in which are dissolved piperazin and ammonia and some aethylendiamin and other compound bodies which accompany, in small quantities, the piperazin. This distillate is first heated to drive off the ammonia and then acidulated with a suitable acid, such as hydro-chloric, sulphuric, or phosphoric acid, to form a piperazin salt. The distillate is then evaporated to dryness, or nearly so, and a solid alkali hydrate, such as caustic soda or caustic potash, is added, preferably in excess, and the mixture distilled. The piperazin salt is thereby decomposed and the piperazin passes over. This piperazin contains some water, the percentage of water depending upon the proportion of the alkali to the piperazin salt, the piperazin containing the less water, the more alkali is used in proportion to the piperazin salt. In order to produce a piperazin hydrate which contains the greatest possible percentage of water, we add water to the distillate until it ceases to fume and then cool the mixture. The substance which crystallizes out of the solution is the piperazin hydrate containing six molecules of water, which is the hydrate containing the largest possible percentage of water. A concentrated aqueous solution of caustic soda or caustic potash may be employed instead of the solid alkali.

Another satisfactory method of producing the piperazin hydrate containing six molecules of water, is the following: About six parts of piperazin hydrochloride, produced as above described or in any other suitable manner, are dissolved in about four parts of water. To this solution is added about ten parts of caustic soda and the mixture is distilled. About one part of water is added to the distillate before cooling, or so much water that the water in the distillate exceeds the amount of water which combines with the piperazin in forming the hydrate containing six molecules of water. Upon cooling the distillate the hydrate crystallizes. It is then separated from the mother liquor by filtering or centrifugal separation. The piperazin hydrate so produced is free from ammonia and aethylendiamin, the latter, which is a poisonous substance, remaining in solution in the mother liquor.

The piperazin hydrate is easily distinguished from the piperazin salts mentioned in Patent No. 471,520 and produced by the process of that patent or otherwise. For instance, the hydrate possesses the highly valuable property of dissolving uric acid and albumenoids or albuminous deposits, which renders it very useful as a therapeutic agent. This property is not possessed by those piperazin salts.

We have discovered not only that the base piperazin is a powerful solvent of uric acid but also that it invariably forms with the uric acid a neutral, easily soluble salt, even when the uric acid is in excess, which peculiar action renders it very efficient as a means for removing uric acid from the human system.

The piperazin hydrate is also easily distinguished from anhydrous piperazin. The melting point of anhydrous piperazin ranges from 104° to 112° centigrade, being slightly higher for large quantities than for small quantities, while that of the hydrate containing six molecules of water is about 48° centigrade, and ranges, for hydrates containing a smaller percentage of water, from 39° to 75° centigrade, as follows: $C_4H_{10}N_2$ plus one molecule $H_2O$, melting point 75° centigrade; $C_4H_{10}N_2$ plus two molecules $H_2O$, melting point 56° centigrade; $C_4H_{10}N_2$ plus three molecules $H_2O$, melting point 39° to 40° centigrade; $C_4H_{10}N_2$ plus four molecules $H_2O$, melting point 42° to 43° centigrade; $C_4H_{10}N_2$ plus five molecules $H_2O$, melting point 45° centigrade; $C_4H_{10}N_2$ plus six molecules $H_2O$, melting point 48° centigrade.

The anhydrous piperazin is very hydroscopic, fumes when exposed to air and readily absorbs water and carbonic acid. The hydrate is stable, does not fume when exposed to the air and does not readily absorb carbonic acid.

The anhydrous piperazin has a strong smell, resembling somewhat that of ammonia, while the hydrate is practically odorless. The anhydrous piperazin has strong caustic properties and is therefore, not useful in solid form for therapeutic purposes, while the hydrate is not caustic. The hydrate can be dispensed in the form of pills or tablets and can be cast in the form of pencils and can so be used for treating albuminous deposits, for instance those formed in diphtheria and croup, while the anhydrous piperazin cannot be so utilized. The hydrate, being stable, can be dosed out with uniform certainty while the anhydrous piperazin, being unstable, changes its character continually by the absorption of water and carbonic acid. The anhydrous piperazin dissolves in water under an increase of temperature while the hydrate dissolves under a decrease of temperature.

The piperazin hydrate is readily distinguished from Hoffmann's diaethylendiamin (*Royal Society Proc.*, X, 224) which was a liquid boiling at 170° centigrade and which contained among other substances vinyl combinations, some of which are poisonous.

The piperazin hydrate is readily distinguished from Ladenburg's aethylenimin (*Berichte*, Vol. 21, p. 758) which was a solid substance resembling porcelain having its melting point at 159° to 163° centigrade. This substance was according to this melting point a carbonate.

The piperazin hydrate is also readily distinguished from Schreiner's sperminx. See *Berichte*, 1891, first half year, p. 241, &c., also same publication XXIV, p. 359.

The hydrates containing less than six molecules of water can be produced from the hydrate containing six molecules as follows: An aqueous solution of the hydrate containing six molecules is distilled until the temperature in the resort rises to 108° centigrade. At this temperature the hydrate in solution in the retort is that containing five molecules of water. By raising the temperature to 112° centigrade, the hydrate containing four molecules of water is produced in the retort. By raising the temperature respectively to 118°, 120° and 125° centigrade the hydrates containing respectively three and two molecules and one molecule of water are produced. These temperatures are stated approximately and may vary somewhat in accordance with the size of the retort and other conditions.

The hydrates containing from three to six molecules of water are to be preferred for therapeutic purposes.

We claim as our invention—

The herein described new product, piperazin hydrate, having the formula $$C_4H_{10}N_2+(1+6)H_2O,$$

being an odorless and colorless, stable, crystalline substance, having its melting point between 39° centigrade and 75° centigrade, being easily soluble in water, having no caustic properties and being a strong solvent of uric acid, substantially as set forth.

Witness our hands this 1st day of August, 1893.

WILHELM MAJERT.
ALBRECHT SCHMIDT.

Witnesses:
CARL SPOHN,
CARL SPIEGEL.

It is hereby certified that in Letters Patent No. 505,113, granted September 19, 1893, upon the application of Wilhelm Majert, of Gruenau, and Albrecht Schmidt, of Berlin, Germany, for an improvement in "Piperazin Hydrate," errors appear in the printed specification requiring the following correction, viz: In line 60, page 2, the word "sperminx" should read *spermin;* and in line 68, same page the word "resort" should read *retort;* and that the said Letters Patent should be read with these corrections therein that the same may conform to the record of the case in the Patent Office.

Signed, countersigned, and sealed this 3d day of October, A. D. 1893.

[SEAL.]

WM. H. SIMS,
*First Assistant Secretary of the Interior.*

Countersigned:
S. T. FISHER,
*Acting Commissioner of Patents.*